(12) United States Patent
Grote et al.

(10) Patent No.: US 7,721,902 B2
(45) Date of Patent: May 25, 2010

(54) FUEL ANTI-SIPHON DEVICE

(75) Inventors: Jeff M. Grote, Ankeny, IA (US); Clarence Rail, Ankeny, IA (US)

(73) Assignee: NEFFCO Tech, LLC, Ankeny, IA (US)

( * ) Notice: Subject to any disclaimer, the term of this patent is extended or adjusted under 35 U.S.C. 154(b) by 420 days.

(21) Appl. No.: 11/769,203

(22) Filed: Jun. 27, 2007

(65) Prior Publication Data
US 2007/0295725 A1 Dec. 27, 2007

Related U.S. Application Data

(60) Provisional application No. 60/805,934, filed on Jun. 27, 2006.

(51) Int. Cl.
*B65B 3/00* (2006.01)
(52) U.S. Cl. .................................... 220/86.3
(58) Field of Classification Search ............... 220/86.2, 220/86.3; 137/592; 141/255
See application file for complete search history.

(56) References Cited

U.S. PATENT DOCUMENTS

| | | | |
|---|---|---|---|
| 1,971,714 A * | 8/1934 | Harkness | 220/86.3 |
| 2,017,837 A * | 10/1935 | Anschicks | 220/315 |
| 2,099,558 A | 11/1937 | Dibelka et al. | |
| 2,147,755 A | 2/1939 | Roberts | |
| 2,313,266 A | 3/1943 | Roberts | |
| 2,496,992 A | 2/1950 | Glidden | |
| 4,343,410 A | 8/1982 | Lenda | |
| 4,630,748 A * | 12/1986 | Keller | 220/86.3 |
| 7,040,360 B2 * | 5/2006 | Watson | 141/255 |

OTHER PUBLICATIONS

"Temco Drop in Antisiphon" Pamphlet, Sep. 8, 2005, 1 page.

* cited by examiner

*Primary Examiner*—Anthony Stashick
*Assistant Examiner*—Harry A Grosso
(74) *Attorney, Agent, or Firm*—McKee, Voorhees & Sease, P.L.C.

(57) ABSTRACT

The anti-siphon device prevents a hose or siphon tube from being inserted into the fuel inlet line for a fuel tank of a vehicle, such as a tractor-trailer. The anti-siphon device includes a tube with cams which are moveable from a retracted position to an extended position via a camming sleeve inserted into the tube. The cams are extended into contact with the inside surface of the fuel tank inlet line and preclude removal of the anti-siphon device from the inlet line. The device further includes flighting which prevents a siphon hose from being inserted through the tube into the fuel tank of the vehicle. Holes are provided in the tube of the device to allow fuel to flow freely into the tank during filling. The fuel also passes through the central opening of the camming sleeve, and through a central opening in the flighting for passage out of the bottom of the tube.

22 Claims, 2 Drawing Sheets

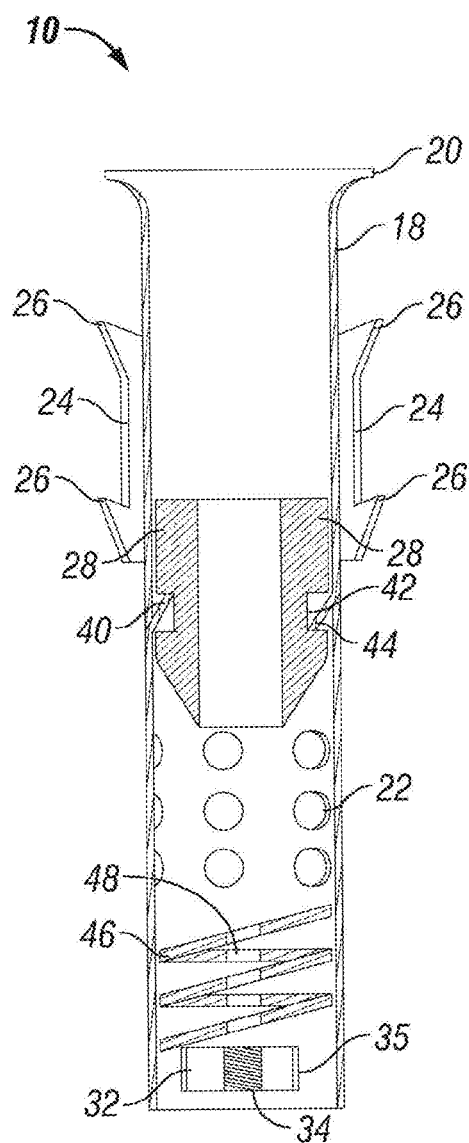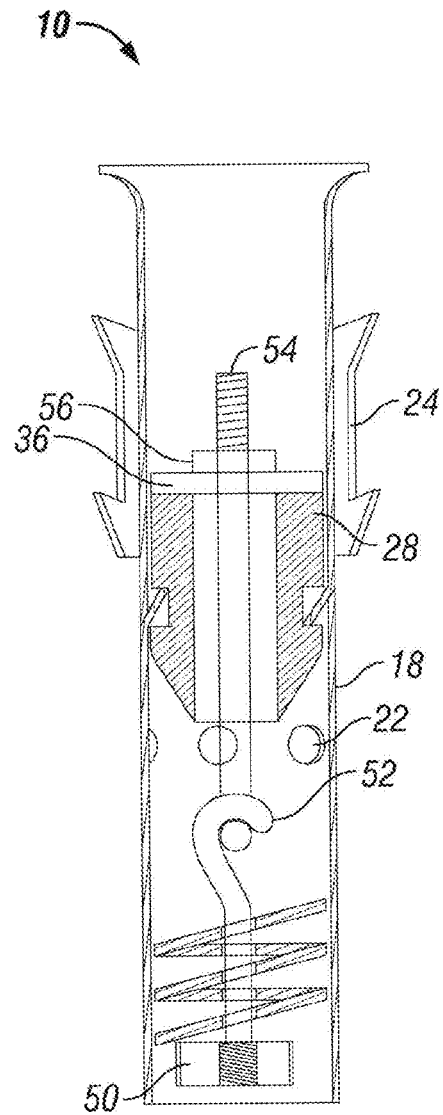

FUEL ANTI-SIPHON DEVICE

CROSS-REFERENCE TO RELATED APPLICATIONS

This application claims priority under 35 U.S.C. §119 to provisional application Ser. No. 60/805,934 filed Jun. 27, 2006, herein incorporated by reference in its entirety.

BACKGROUND OF THE INVENTION

Fuel tanks on over-the-road tractor-trailers and other vehicles have a cap that is easily removed for filling the fuel tanks. Typically, the fuel tanks on such trucks hold 140-150 gallons each, and these trucks commonly having at least two tanks. Other types of motor vehicles, such a motor homes, RVs, and boats also have gas tanks with large capacity. With the increase in the price of gasoline and diesel fuel, fuel theft through siphoning is a common problem for such vehicles. For example, tractor-trailers parked in rest stops and parking lots are a target for thieves to steal fuel, because there is little to hinder the thief, unless someone is standing guard. Locking gas caps may be used to thwart fuel thieves, however, a knowledgeable thief can quickly remove the cap, after which fuel can be siphoned from the tanks easily using a hose or other suction device.

Accordingly, a primary objective of the present invention is the provision of an anti-siphon device which prevents and discourages fuel theft from vehicles, including tractor-trailers.

Therefore, a primary objective of the present invention is the provision of a fuel anti-siphon device which is easy to install, difficult to remove, and prevents siphoning of gasoline and diesel from fuel tanks.

Another objective of the present invention is a fuel theft deterrent device that is permanently mounted in the fuel inlet line of a vehicle.

Yet another objective of the present invention is an anti-siphoning device that cannot be removed after it is installed in the fuel inlet line of a vehicle.

Still another objective of the present invention is the provision of an anti-siphoning device that does not interfere with filling the fuel tank of a vehicle.

Another objective of the present invention is the provision of an anti-siphoning device which does not require a different fuel cap.

Still another objective of the present invention is the provision of an anti-siphoning device that resides within the neck of the fuel inlet line of a vehicle, so that a standard or stock fuel cap can be utilized for the fuel inlet line.

Yet another objective of the present invention is the provision of an anti-siphoning device that is not visible when the fuel cap is in place.

A further objective of the present invention is the provision of an anti-siphoning device for a vehicle fuel tank which can withstand a blow from a hammer or other striking tool, and remain intact and functional.

Still another objective of the present invention is the provision of an anti-siphoning device which allows fuel to flow through the device at a substantially unrestricted rate.

A further objective of the present invention is the provision of an anti-siphoning device which precludes a siphon hose from being extended therethrough.

Still another objective of the present invention is the provision of an anti-siphoning device which is economical to manufacture, and durable and effective in use.

These and other objectives will become apparent from the following description of the invention.

BRIEF SUMMARY OF THE INVENTION

The anti-siphon device of the present invention utilizes a tube installed in the neck of the fuel line for a fuel tank of a vehicle, such as a tractor-trailer. The tube includes cams which are moveable from a retracted position for inserting the tube into the neck of the fuel line, and an extended position engaging the fuel line which precludes removal of the tube from the neck of the fuel line. An inner sleeve is placed inside the tube to force the cams outwardly to the extended position, and precludes movement of the cams back to the retracted position. A spiral flighting segment resides in the lower end of the tube to preclude a siphoning hose from being inserted through the tube, without interfering with the flow of fuel through the tube. The wall of the tube also includes a plurality of holes through which fuel freely flows for fueling the fuel tank.

BRIEF DESCRIPTION OF THE DRAWINGS

FIG. 3 is a sectional view of the device after installation.

FIG. 4 is a sectional view of the device having an alternate embodiment.

DETAILED DESCRIPTION OF THE PREFERRED EMBODIMENT

Figure 1:
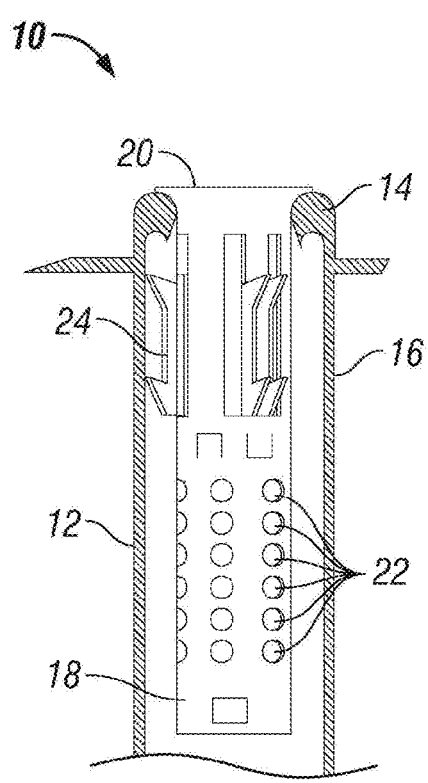
FIG. 1 is a sectional view of an anti-siphon device installed in the neck of a vehicle fuel tank inlet line.

The anti-siphon device of the present invention is generally designated by the reference number 10 in the drawings. The device 10 is adapted for use in the inlet line 12 of a vehicle fuel tank, such as a tractor-trailer fuel tank. The inlet line 12 includes a throat 14 and a neck 16. A fuel cap (not shown) normally closes the throat 14, except during fueling. The fuel may be gasoline or diesel.

The anti-siphon device 10 generally includes an elongated cylindrical tube 18 having a flared lip 20 at the upper end. The lip 20 engages the throat 14 so as to preclude the tube 18 from falling into the neck 16. The lip may extend 360° as shown in the drawings, or may be short segments to support the tube 18 on the throat 14.

The lower portion of the side wall of the tube 18 includes a plurality of openings 22 through which fuel passes when the fuel tank is being filled. The holes 22 may have various sizes and/or shapes, but are sufficient in size and number so as to allow the fuel to flow freely into the inlet line 12 of the fuel tank.

Figure 2:
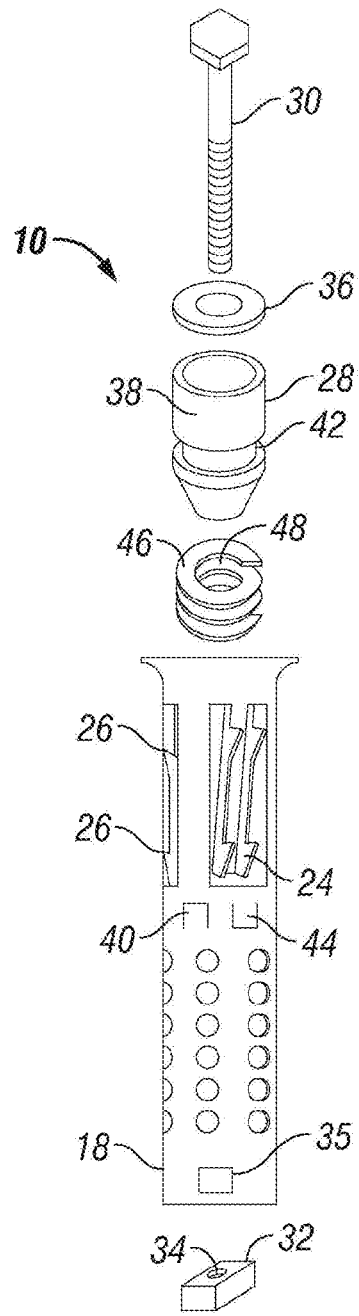
FIG. 2 is an exploded view of the device with the tool used to install the device in the inlet.

The tube 18 also includes a plurality of cams 24 which are moveable from an initial retracted position to an extended, use position. The retracted position of the cams 24 is shown in FIG. 2, while the extended position of the cams 24 is shown in FIGS. 1 and 3. The cams 24 include points or teeth 26 which engage, or penetrate, the neck 16 and preclude removal of the tube 18 from the fuel inlet line 12. Preferably, the cams 24 are formed integrally in the tube 18. For example, the outline of the cams 24 can be laser cut into the tube 18, and the points 26 can be bent outwardly using an appropriate tool or jig. Preferably, the tube 18 is made of stainless steel or similar material such that the cams 24 are strong and stiff.

As an alternative to cams 24 with integrally formed points or teeth 26, the points or teeth can be separate components which are secured to the tube 18 for movement from the retracted position to the extended position in any convenient manner.

In the preferred embodiment, the cams 24 initially in the retracted position with the teeth 26 being positioned substantially flush with the wall of the tube 18, so that the tube can be inserted into the neck 16 of the fuel inlet line 12. Then, the cams 24 are moved from the retracted position to the extended position using a tool designed for such use. More particularly, the tool includes a hollow sleeve 28 having an outer diameter slightly smaller than the inner diameter of the tube 18. The lower end of the sleeve 28 is tapered. An elongated bolt 30 extends through the sleeve 28, with the lower end of the bolt 30 being threadably received in a crossbar or stop member 32 having a threaded aperture 34. The crossbar 32 is received in opposing holes 35 in opposite sides of the tube 18. A washer or cap 36 engages the top of the sleeve 28, such that as the bolt 30 is tightened, the sleeve 28 is forced downwardly through the tube 18. As the sleeve 28 moves into engagement with the retracted cams 24, the body 38 of the sleeve 28 pushes the cams 24 outwardly so that the points or teeth 26 engage the inner surface of the neck 16. The tube 18 includes a pair of resilient tabs 40 on opposite sides of the tube which engage an upper shoulder on a groove or recess 42 formed in the sleeve 28, thereby limiting further downward movement of the sleeve 28 in the tube 18. A second pair of resilient tabs 44 on opposite sides of the tube 18 engage the lower shoulder of the groove or recess 42 so as to prevent the sleeve 28 from being withdrawn from the tube 18. The tabs 40, 44 are resilient so as to spread out when the sleeve 28 is being forced downwardly, and then spring inwardly to engage the shoulders of the groove 42. The body 38 of the sleeve 28 also prevents the cams 24 from returning from the extended position to the retracted position, such that the tube 18 cannot be removed from the neck 16 once the device 10 is installed. Lastly, the bolt 30 and cap 36 are removed to complete the installation of the device 10.

A stiff, spiral flighting segment 46 resides in the tube 18 so as to further prevent a siphon tube from being inserted through the tube. The flighting 46 rests upon the lower crossbar 32. The flighting 46 includes a central hole 48 through which the bolt 30 extends during the installation process. The diameter of the flighting 46 is slightly less than the inside diameter of the tube 18 so that the outer edge of the flighting 46 is adjacent the inner surface of the tube 18 along the full length of the flighting 46. The flighting 46 is incompressible, so that it cannot be deformed by a thief trying to insert a hose or siphon tube past the flighting 46. When the bolt 30 and washer 36 are removed after installation, fuel is free to flow through the hole 48 and the flighting 46, as well as along the ramp surface of the flighting 46.

As an alternative to the crossbar 32, an inverted T-shape retainer 50 can be installed in the bottom of the tube 18, with the central leg extending upwardly through the hole 48 in the flighting 46. The base of the retainer 50 is received in the holes 35 at the lower end of the tube 18. The upper end of the T-shaped member 50 may include a hook 52 for receiving an eye-bolt 54. A nut 56 on the top of the eye-bolt 54 can be turned with a socket for installing the sleeve 28 into the tube 18. The eye-bolt 54 can then be removed by removing the nut 56 and disengaging the eye-bolt from the hook 52.

Once the device 10 is installed in the fuel line 12, it is very difficult, if not impossible, for a thief to remove the sleeve 28, or otherwise retract the cams 24. Thus, the tube 18 is fixed in the fuel line 12. The interval structure in the tube 18, including the sleeve 28 and the flighting 46, makes it nearly impossible to put a siphon hose through the tube 18 and into the fuel tank. Therefore, the anti-siphon device 10 is quick and easy to install and precludes fuel theft.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A fuel anti-siphon device for preventing theft of fuel from a fuel tank, the tank having a throat and a removable cap, the device comprising:
   a tube insertable into the throat and having upper and lower ends;
   flighting in the tube to allow fuel to pass into the tank and to prevent a hose from being inserted into the tank;
   cams mounted on the tube for movement between a retracted position substantially within the tube for insertion of the tube into the throat and an expanded position substantially outside the tube to prevent the tube from being removed after installation in the throat; and
   an inner sleeve within the tube to force the cams from the retracted position to the expanded position and to preclude the cams from being returned to the retracted position.

2. The anti-siphon device of claim 1 wherein the cams are integrally formed with the tube.

3. The anti-siphon device of claim 1 wherein the sleeve is secured inside the tube by tabs on the tube.

4. The anti-siphon device of claim 3 wherein the sleeve has a recess for receiving the tabs.

5. The anti-siphon device of claim 3 further comprising a cross bar extending across the bottom of the tube to keep the flighting in the tube.

6. The anti-siphon device of claim 5 wherein the cross bar has a threaded opening, the device further comprising an elongated bolt with a lower end adapted to be threadably received in the opening of the cross bar, and an upper end with a washer to engage a top surface of the inner sleeve, wherein upon turning of the bolt drives the sleeve past the cams and into secured engagement with the tabs.

7. The anti-siphon device of claim 6 wherein the bolt and washer are removed after the sleeve is secured.

8. The anti-siphon device of claim 1 wherein the tube has a sidewall with holes for passage of fuel.

9. The anti-siphon device of claim 1 wherein the tube has an upper flared end to prevent the tube from falling through the throat.

10. The anti-siphon device of claim 1 wherein the flighting has a length and an outer edge residing adjacent an inner surface of the tube along the full length of the flighting.

11. The anti-siphon device of claim 1 wherein the flighting is incompressible.

12. An anti-siphon device kit for installation in a fuel tank inlet line having a throat and a neck, the kit comprising:
   a tube with an upper end residing outside the throat and a lower end extending into the neck;
   a hollow sleeve slidable into the tube;
   a stop member at the bottom of the tube and having a threaded hole;
   a pair of cams on the tube moveable from a retracted position to an extended position; and
   a bolt extending through the tube with a lower end threaded into the hole in the stop member, and being rotatable to force the sleeve into engagement with the cams and thereby move the cams from the retracted position to the extended position residing outside the tube so as to prevent the tube from being withdrawn from the tank inlet line.

13. The kit of claim 12 further comprising a flighting segment in the tube to prevent a hose from being inserted through the tube and into the tank.

14. The kit of claim 13 wherein the flighting extends in at least two revolutions adjacent an inside surface of the tube.

15. The kit of claim 12 wherein the cams are integrally formed with the tube.

16. The kit of claim 12 wherein the bolt is removed after the cams are extended.

17. The kit of claim 12 further comprising a pair of tabs on the tube to retain the sleeve in position in the tube.

18. The kit of claim 17 wherein the sleeve includes a groove for receiving the tabs.

19. An anti-siphon device for preventing theft of fuel from a fuel tank having an inlet throat and neck, the device comprising:

a cylindrical tube permanently installed in the neck;

incompressible flighting in the tube to prevent a hose from being inserted through the tube;

the flighting defining a ramped surface along which fuel flows; and the flighting having a constant diameter, and having upper and lower ends and an outer perimeter edge residing adjacent the tube between the upper and lower ends.

20. The anti-siphon device of claim 19 wherein the flighting has a central opening through which fuel may flow.

21. The anti-siphon device of claim 19 wherein the tube has openings through which fuel flows.

22. The anti-siphon device of claim 19 further comprising at least one member engaging the neck to preclude removal of the tube from the inlet line.

* * * * *